United States Patent
Giuriati

(10) Patent No.: US 6,931,959 B2
(45) Date of Patent: Aug. 23, 2005

(54) TRAIN HOUSING FOR PSEUDO-PLANETARY KINEMATIC TRANSMISSION

(75) Inventor: Adriano Giuriati, Padua (IT)

(73) Assignee: ZF Padova S.p.A., Selvazzano Dentro Fraz. Caselle (IT)

( * ) Notice: Subject to any disclaimer, the term of this patent is extended or adjusted under 35 U.S.C. 154(b) by 0 days.

(21) Appl. No.: 10/153,601

(22) Filed: May 24, 2002

(65) Prior Publication Data

US 2002/0178851 A1 Dec. 5, 2002

(30) Foreign Application Priority Data

May 29, 2001 (IT) ..................................... PD2001A0123

(51) Int. Cl.⁷ .............................................. F16H 19/00
(52) U.S. Cl. ........................ 74/413; 475/331; 475/338
(58) Field of Search ........................ 74/413, 410, 414; 475/323, 331, 338, 348

(56) References Cited

U.S. PATENT DOCUMENTS

| | | | |
|---|---|---|---|
| 2,941,423 A | * | 6/1960 | Armington et al. ......... 475/338 |
| 3,021,731 A | * | 2/1962 | Stoeckicht .................. 475/344 |
| 3,513,715 A | | 5/1970 | Bank et al. |
| 3,527,121 A | * | 9/1970 | Moore ......................... 475/338 |
| 3,939,736 A | * | 2/1976 | Morin ......................... 475/338 |
| 4,096,769 A | * | 6/1978 | Horikiri et al. ............. 475/347 |
| 4,187,740 A | * | 2/1980 | Silvestri ..................... 475/338 |
| 4,281,565 A | * | 8/1981 | Lower ........................ 475/323 |
| 4,793,214 A | * | 12/1988 | Nurnberger et al. ........ 475/331 |
| 5,366,423 A | * | 11/1994 | Mori et al. ................. 475/346 |
| 5,509,865 A | * | 4/1996 | Hall, III ..................... 475/340 |
| 6,248,038 B1 | * | 6/2001 | Nilsson et al. ............. 475/286 |

FOREIGN PATENT DOCUMENTS

| | | |
|---|---|---|
| EP | 0 271 416 | 6/1988 |
| GB | 660 879 | 11/1951 |
| WO | 00 17540 | 3/2000 |

* cited by examiner

Primary Examiner—William C. Joyce
(74) Attorney, Agent, or Firm—Guido Modiano; Albert Josif; Daniel O'Byrne

(57) ABSTRACT

A composite train housing for pseudo-planetary kinematic transmission, which comprises three components namely two external ones fixed to a central one, axial posts being formed between the components.

3 Claims, 3 Drawing Sheets

TRAIN HOUSING FOR PSEUDO-PLANETARY KINEMATIC TRANSMISSION

BACKGROUND OF THE INVENTION

The present invention relates to a composite train housing for pseudo-planetary kinematic transmission.

Known coaxial kinematic transmissions that need to obtain ratios of more than 7–8 by using simple sun-and-planet gear systems generally entail the adoption of multiple reduction (or step-up) stages if trains of the type shown in FIG. 1 of the accompanying drawings are adopted.

In FIG. 1, X1 and X2 designate the shafts between which motion is transmitted (speeds $\overline{\omega}_1$ and $\overline{\omega}_2$), A designates the sun gear, B designates the internal ring gear, a and b designate the planet gears, and the train housing is designated by U.

There are still good possibilities of execution, for average ratios which are in any case higher than those possible with the type shown in FIG. 1, when using trains of the type shown in FIG. 2 (in which the same terms are used), in which the planet gears a and b are coupled, with the advantage of obtaining the required ratio with a single set instead of two trains of FIG. 1 arranged in a cascade configuration.

Furthermore, in the case of FIG. 2 a single internal ring gear is used, whereas it is difficult to manufacture planet gears a and b of very high precision as regards the phasing between the toothed bands, in order to ensure correct meshing with the mating gears.

If one wishes to use a sun-and-planet gear system in high-speed transmissions, it is currently necessary to keep the train housing or spider U motionless, in order to avoid centrifugal stresses on the planet gears a and b and especially on the bearings of the planet gears.

In the case of a fixed train housing or spider U and of rotating sun gear A and internal ring gear B, the reduction train is termed pseudo-planetary.

This is true both for the type shown in FIG. 1 and for the type shown in FIG. 2.

A characteristic of this solution is the opposite direction of rotation between the input and the output.

A considerable limitation to the production of a pseudo-planetary train of the type shown in FIG. 2 is constituted by the limited space available for providing a rigid structure for the train housing U, which is formed monolithically, with particular reference to the posts that connect the two shoulders of said train housing, as shown in particular in FIGS. 3 and 4 (which are diametrical and transverse sectional views of a reduction unit), in which the posts are designated by M and the shoulders are designated by S.

This limitation is linked to the need to join the two shoulders S by passing close to both series of planet gears a and b and remaining within the addendum circle of the internal set of teeth B.

The result is a highly convoluted shape of the posts M that is almost always very narrow if not entirely insufficient.

The problem of the assembly of the various components is also very difficult and sometimes even impossible.

Moreover, it is impossible to adopt large bearings, whose presence would be sometimes desirable.

SUMMARY OF THE INVENTION

The aim of the present invention is to provide a train housing or spider for pseudo-planetary kinematic transmission that eliminates the drawbacks mentioned above in known types, combining high operating rigidity with easy assembly and high machining quality.

Within this aim, a primary object is to meet the possible need to adopt large bearings.

Another object is to have a high rigidity of the train housing body and to minimize vibrations and flexing of the structure under the most challenging load conditions.

Another object is to provide all of the above at a reasonable cost.

This aim and these and other objects that will become better apparent hereinafter are achieved by a train housing for pseudo-planetary kinematic transmission, characterized in that it is composite and comprises three components, namely two external ones fixed to a central one, axial posts being formed between said components.

Advantageously, each one of the two external components of said three is provided monolithically with its own axial post, directed toward said central element and fixed thereto.

BRIEF DESCRIPTION OF THE DRAWINGS

Further characteristics and advantages of the present invention will become better apparent from the following detailed description of an embodiment thereof, illustrated only by way of non-limitative example in the accompanying drawings, wherein.

DESCRIPTION OF THE PREFERRED EMBODIMENTS

Figure 1:
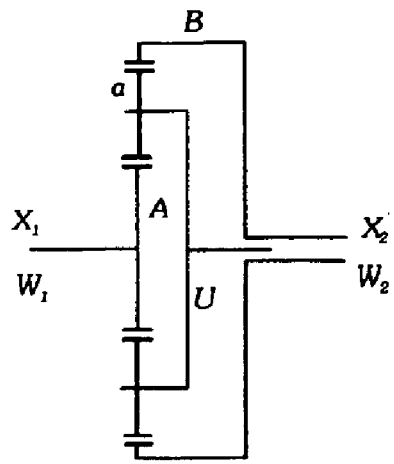
FIG. 1 is a diagram of a first type of transmission according to the prior art.
Figure 2:
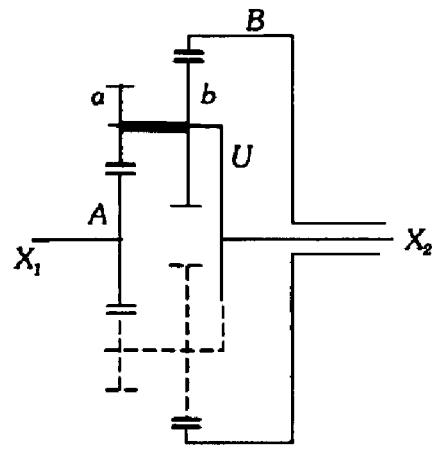
FIG. 2 is a diagram of a second type of transmission according to the prior art.
Figure 3:
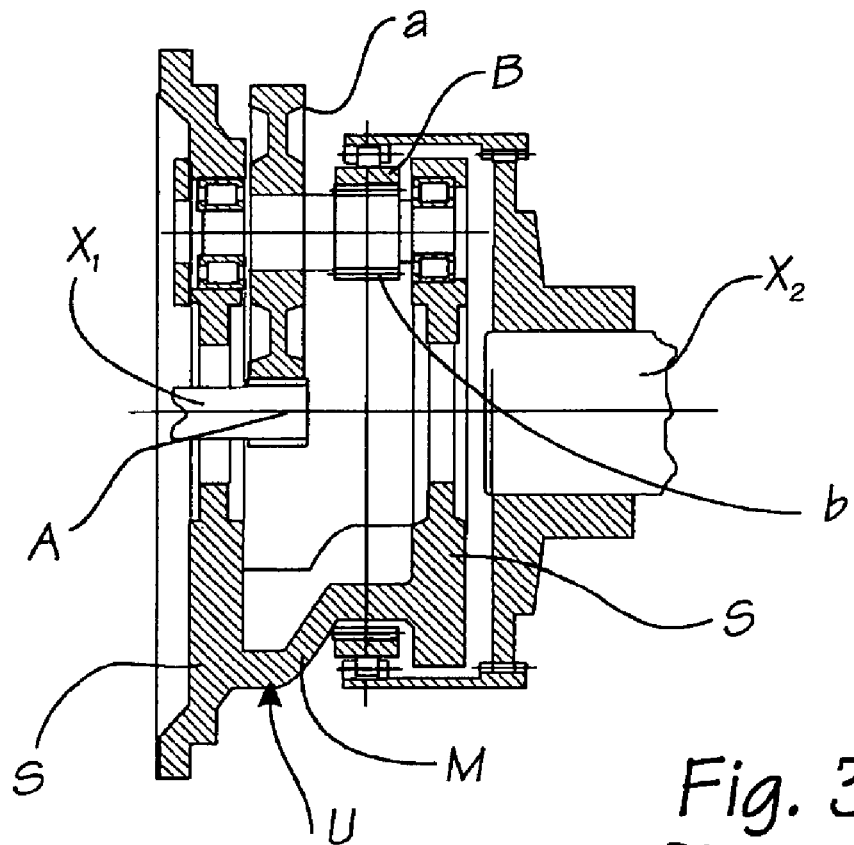
FIGS. 3 and 4 are sectional views, taken along mutually perpendicular planes, of a transmission (reduction unit) according to the diagram of FIG. 2.
Figure 4:
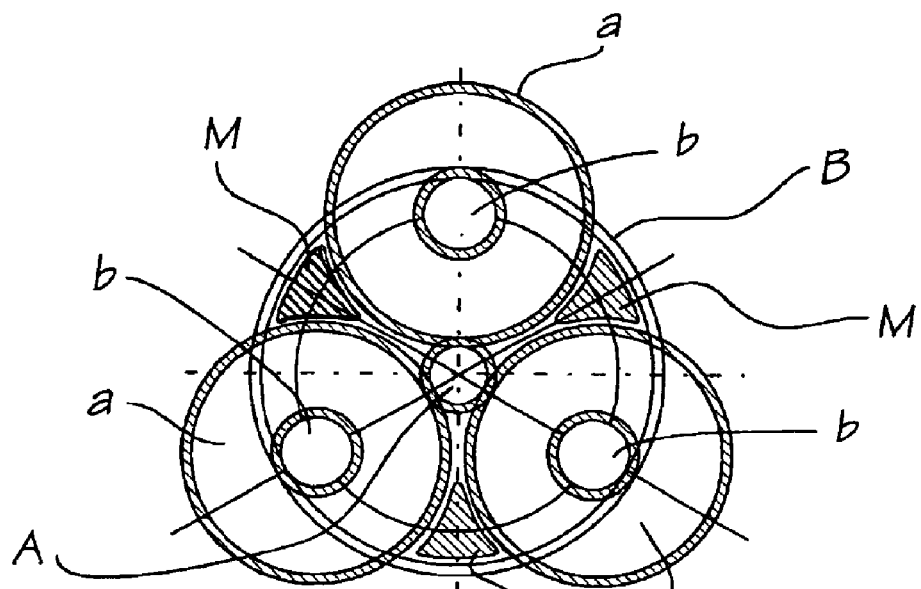
Figure 5:
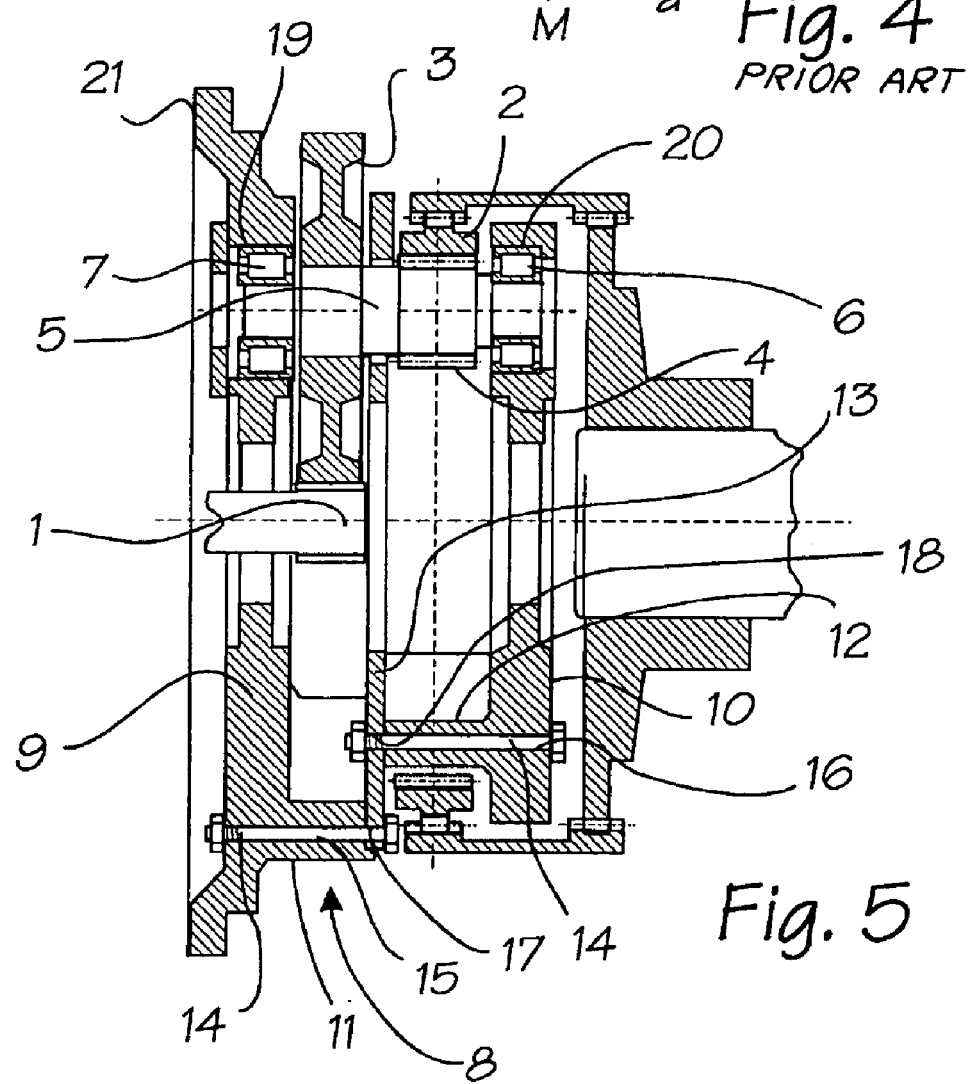
FIG. 5 is a sectional view of a transmission (reduction unit) provided with a train housing according to the present invention.
Figure 6:
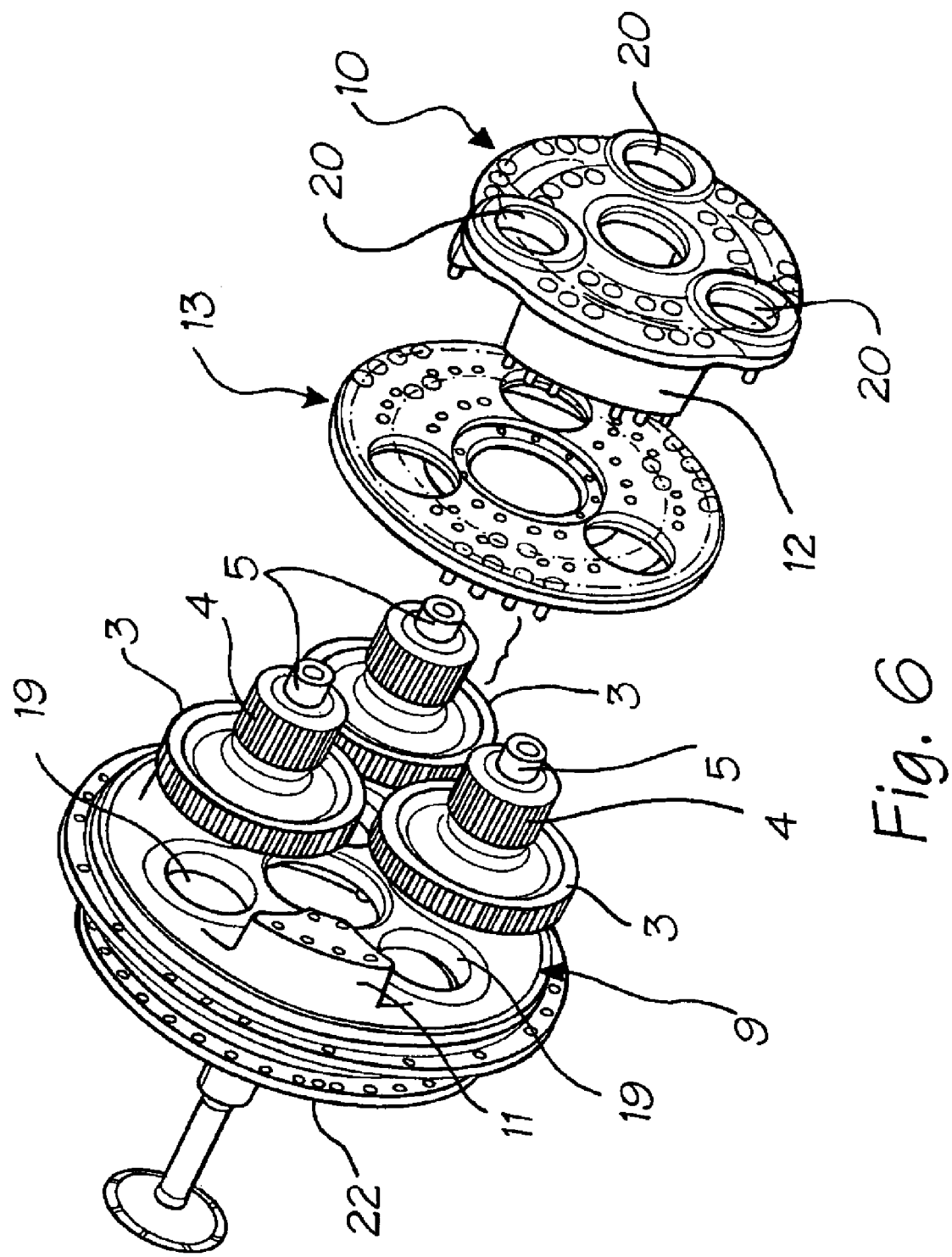
FIG. 6 is an exploded perspective view of the train housing according to the invention.

With reference to FIGS. 5 and 6, a speed reduction unit provided with a train housing or spider according to the present invention substantially comprises a sun gear 1, an internal ring gear 2, pairs of planet gears, each composed of planet gears 3 and 4 that are rigidly coupled to a common pivot 5 whose ends are rotatably coupled, by means of bearings 6 and 7, to a fixed train housing 8.

The train housing, according to the invention, is composite, i.e. has a composite structure or arrangement, and comprises two disk-like external components or elements, designated by the reference numerals 9 and 10 respectively, which monolithically and peripherally support its own axial post (protrusion), designated by the reference numerals 11 and 12 respectively, which are directed toward, and fixed to, a central element 13, which is also disk-like.

The posts 11 and 12, which are nothing other than elements for connecting one another the components of the train housing 8 in the regions engaged axially by the planet gears 3 and 4, are conveniently arranged at the same angular positions, intercalated with those of the seats 19 and 20 of the bearings 6 and 7.

The set is preassembled, by means of bolts 14 that pass through suitable through holes 15, 16, 17 and 18, which pass through the elements 9, 10 and 13 and the posts 11 and 12 before the final machining of the seats 19 and 20 of the bearings 6 and 7 that support the planetary gears 3 and 4 and of the reference surfaces, so as to ensure maximum precision together with easy execution.

The element 9, on the opposite side with respect to its posts 11, is shaped so as to define a flange 21 for fixing to the body of the reduction unit (not shown in the figures) with the aid of an annular element 22 that is fixed to the flange 21 by means of bolts (not shown).

The three elements 9, 10 and 13 can be separated one another after machining and easily reassembled, so as to not be a problem for rapid and precise assembly of the various components of the kinematic chain.

In practice it has been observed that the intended aim and objects of the present invention have been achieved.

The new train housing 8 in fact has maximum dimensions with respect to the space available proximate to the rotating parts, with correct transfer of stresses and minimum impact on overall space occupation.

The limits set by the dimensions of the sets of teeth of the planet gears 3 and 4 and of the internal ring gear 2 are thus overcome, with ample possibilities of solutions to meet also the need to adopt large bearings (which, as mentioned in the preamble, could not be used before due to the limited space available).

Moreover, there is a high rigidity of the train housing body 8, with great benefit in minimizing vibrations and flexing of the structure under the most demanding load conditions.

The invention thus conceived is susceptible of numerous modifications and variations, all of which are within the scope of the appended claims.

In practice, the materials employed, so long as they are compatible with the contingent use, as well as the dimensions, may be any according to requirements.

The disclosures in Italian Patent Application No. PD2001A000123 from which this application claims priority are incorporated herein by reference.

What is claimed is:

1. A train housing and speed reduction unit for a pseudo-planetary kinematic transmission, comprising:

an input sun gear(1);

planet gear pairs each comprising a first planet gear (3) and a second planet gear (4), said first and second planet gears (3,4) being rigidly coupled to a common pivot (5), said first planet gear (3) meshing with said input sun gear (1), and said first planet gear (3) being larger than said second planet gear (4);

an internal ring gear (2) meshing with said second planet gear (4) of said planet gear pairs;

said train housing (8) comprising a composite arrangement of three components (9, 10, 13), said three components (9,10,13) being constituted by a central component (13) and by two external components (9,10) each removably fixed to said central component (13), and by axial posts (11,12) which are formed so as to protrude between said components (9,10,13);

said common pivot(5) of said planet gear pairs having opposite ends which are rotatably coupled by means of bearings (6,7) respectively to said two external components (9,10) of said train housing (8), and said common pivot (5) of said planet gears extending through a respective hole provided in said central component (13) of said train housing (8);

each one of said external components (9,10) supporting a respective one of said axial posts (11,12), which is formed monolithically thereon and is directed toward, and removably fixed to, said central component (13);

said axial posts (11,12) of said external components (9,10) being each arranged in a peripheral region of a respective one of said external components (9,10), said axial posts (11, 12) of said external components (9,10) extending mutually parallel and at different distances from a central axis of said transmission.

2. The combination of claim 1, further comprising fixing bolts (14), said components (9,10,13) and said posts (11,12) being provided with through holes (15,16,17,18) and being removably fixed together by way of said bolts (14) that pass through amid holes (15,16,17,18).

3. The combination of claim 2, further comprising a flange (21) and an annular element (22) that is bolted to said flange (21), said flange (21) being provided on one (9) of said external components, on a side opposite with respect to the post (11) thereof, said flange (21) being shaped so as to allow fixing to a kinematic transmission by way of said annular element (22).

* * * * *